June 19, 1962   P. P. BIRINGER   3,040,231
SELF-BALANCING POWER SUPPLY SYSTEM HAVING
A SINGLE PHASE OUTPUT ENERGIZED
BY A MULTIPHASE SOURCE
Original Filed Feb. 7, 1958
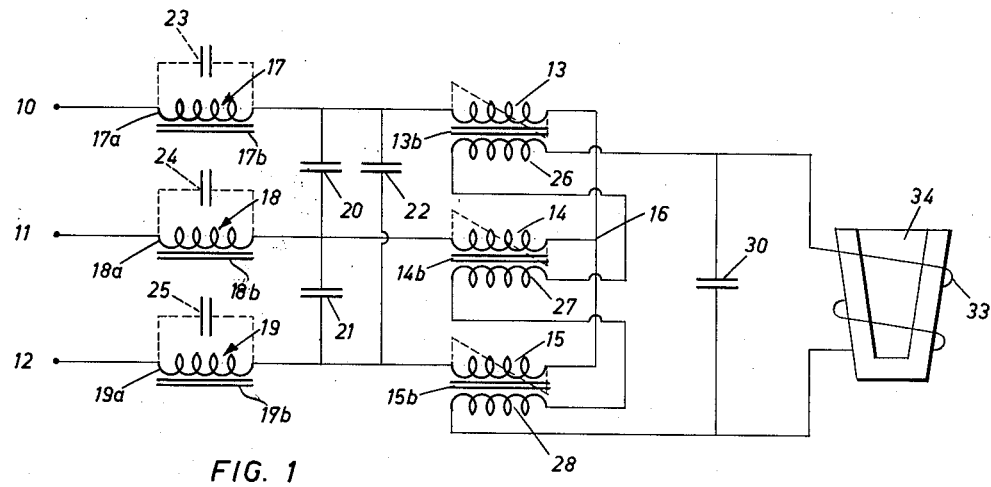
FIG. 1
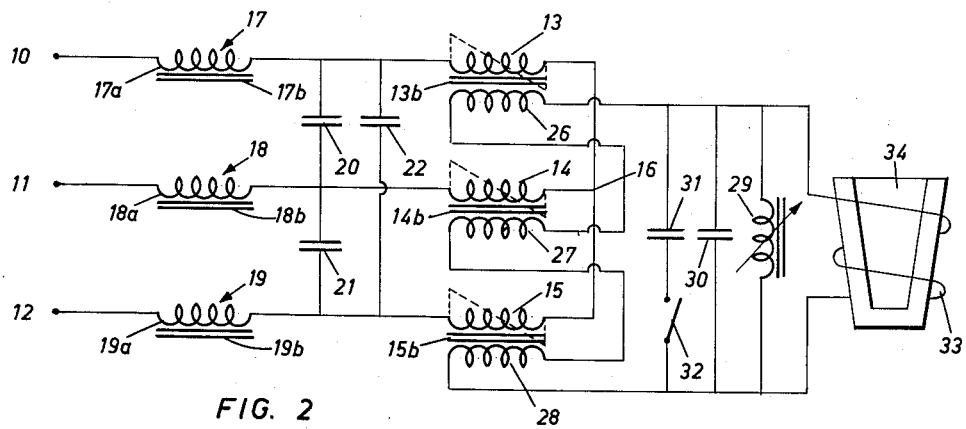
FIG. 2
FIG. 4
NON-LINEAR
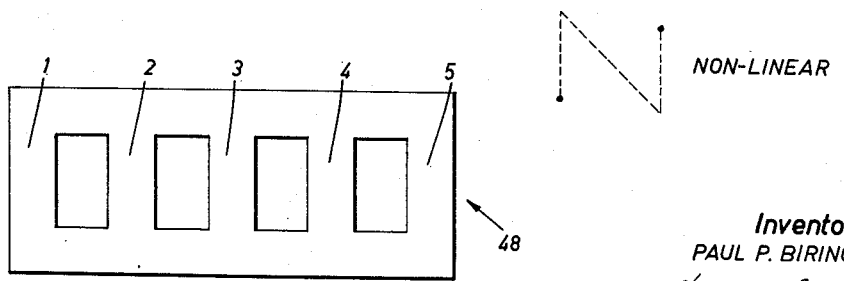
FIG. 3
Inventor
PAUL P. BIRINGER
by: Cavanagh & Norman United States Patent Office 3,040,231
Patented June 19, 1962

3,040,231
SELF-BALANCING POWER SUPPLY SYSTEM HAVING A SINGLE PHASE OUTPUT ENERGIZED BY A MULTIPHASE SOURCE
Paul P. Biringer, Toronto, Ontario, Canada, assignor, by mesne assignments, to Ajax Magnethermic Corporation, Youngstown, Ohio, a corporation of Ohio
Continuation of application Ser. No. 713,943, Feb. 7, 1958. This application Mar. 31, 1958, Ser. No. 725,004
6 Claims. (Cl. 321—7)

This invention relates to a self-balancing power supply system having a single phase output energized by a multiphase source.

Previous attempts to provide single phase frequency multiplied output from a multiphase source such as a three phase source have been unsuccessful by reason of the substantial power factor correction required. Thus, for example, a single output winding on the common leg of a three phase Y core construction having three primary windings on separate core legs common to the central leg causes harmonics to be reflected into the source energizing the primary windings.

Having regard to the foregoing, it is the main object of the invention to provide a power supply system adapted for energizing induction heating furnaces or like heavy load demands with an input power factor for the system very close to unity and in which output harmonics are not reflected in the source and the effective load current is symetrically distributed on the source i.e. the system is self-balanced.

It is another object of the invention to provide an effectively self-balanced power supply system as herein set forth adapted to convert three phase sixty cycle line frequency or the like to a higher frequency single phase output.

It is a further object of the invention to provide an induction heating power supply system adapted to convert a multiphase frequency source to a higher frequency single phase output of satisfactory power factor.

With the foregoing and other objects in view, the invention generally concerns a power supply system adapted to deliver single phase output electrical power, energizable by a multiphase source of electrical power of predetermined frequency, and comprising in combination: a current dependent inductance for each phase of said source energizable by the latter having a current voltage relationship which is non-linear for each phase of said source; a reactance having a current voltage relationship which is linear disposed between each current dependent inductance and the corresponding phase of said source providing a high impedance path for harmonic currents of said frequency reflected by said current dependent inductances, said linear reactances developing non-sinusoidal voltages phase to phase between said linear reactances and said current dependent inductances; means interposed between said current dependent inductances for providing a low impedance path for harmonic currents passing non-sinusoidal current to said current dependent inductances, thereby to energize the latter; and means to provide single phase high frequency power symmetrically distributed with respect to said source; the relationship between the low impedance means and the high impedance means is such that a substantial unity power factor results at the source.

Reference is made to a co-pending application Serial No. 713,943, filed Feb. 7, 1958, of the same inventor relating to Single Phase Power Supply System Having A Multiphase Source of which this is a continuation.

Other objects of the invention will be appreciated in more detail by reference to the following specification disclosing specific practical arrangements by way of illustration in conjunction with the accompanying drawings.

In the drawings:

FIGURE 1 is an electrical schematic of a preferred power system for converting a multiphase power source to single phase high frequency power output for induction heating service;

FIGURE 2 is a modification of the system of FIGURE 1, having voltage regulation;

FIGURE 3 is a diagrammatic illustration of a form of core construction usable in the power supply system of the invention;

FIGURE 4 is a legend indicating the non-linear elements of FIGURES 1 and 2.

The system of the invention is shown in one suitable form in FIGURE 1. A multiphase source such as a three phase source at terminals 10, 11 and 12 energizes current dependent inductances, i.e. primary structures for each said phase of said source energizable by the latter having a current voltage relationship which is non-linear for each phase of the source, 13, 14 and 15, as shown by the dotted line legend of FIGURE 4, connected to a star connection point 16. The current dependent inductances are separated from the source terminals 10, 11 and 12 by reactances for current 17, 18 and 19, said reactances having a current voltage relationship which is linear and which may be provided in the form of inductances such as chokes, having an air gap (not shown) and windings 17a, 18a and 19a, the latter serving to connect the current dependent inductances to the source and serving also to isolate the source from harmonics, the reactances 17, 18 and 19, or chokes, providing a high impedance path for harmonic components of the frequency reflected by the current dependent inductances 13, 14 and 15 and develop non-sinusoidal voltages phase to phase between said linear reactances and each current dependent inductance. Condensers 20, 21 and 22 are connected to be supplied with said non-sinusoidal voltage developed phase to phase between the linear reactances and the current dependent or non-linear inductances, provide a low impedance path for harmonic currents and pass non-sinusoidal current to said current dependent inductances.

The reactances 17, 18 and 19 may have associated therewith condensers 23, 24 and 25 respectively, connected in parallel with each to create a parallel resonance circuit of a selected frequency of fifth to seventh harmonic order.

Each of the cores of the reactances 17, 18 and 19 and inductances 13, 14 and 15 designated by "b" consists of a magnetic material such as laminated iron. While the cores are shown schematically it will be understood that any core in the form of E-I laminations, C-cores or other conventional arrangement providing a linear current voltage relationship will be suitable for the purposes of the invention. Each of the cores 17b, 18b and 19b carries one winding and is designed to provide a linear current-voltage characteristic relationship for the supply current. The linearity is achieved preferably by providing an air gap in the magnetic circuit of each core. In accordance with known design technique the dimensions of the required air gap will depend upon the current range of the linear current-voltage characteristic referred to herein also as linear reactances.

The cores 13b, 14b and 15b are designed to operate in the non-linear part of their B-H characteristic. Operation within this range requires high magnetizing currents consisting of fundamental fifth and higher harmonics supplied by the condensers 20, 21 and 22 described. Present conventional core materials require a high percentage of fifth harmonic current in the high flux density range. The condensers supply both the fundamental and fifth harmonic magnetizing current to the core. The single phase output windings or secondaries 26, 27 and 28 are connected electrically in series effectively to constitute a single output winding for single phase output and are magnetically coupled to their respective primary windings 13, 14 and 15 by the cores 13b, 14b and 15b.

In FIGURE 2 a modification of the system disclosed in FIGURE 1 will be evident in that voltage regulation is accomplished by providing a variable reactor 29 connected in parallel with condenser 30, which latter condenser may be parallel with a further condenser 31 controlled by a manual switch 32 for effecting power factor correction.

In FIGURE 3 a form of core construction 48 is illustrated. Five core legs designated by numerals 1 to 5 carry the primary windings 13, 14 and 15 distributed on legs 2, 3 and 4 or legs 1, 3 and 5. The remaining two core legs which do not carry a primary winding will be conductors for substantially high harmonic flux. Accordingly, a single phase output may be obtained readily by placing a single phase winding (not shown) on either or both of the two remaining legs.

Aside from the advantages of the power supply system which will be evident to skilled persons, it will be apparent that the input power factor of the power supply system of the invention is very close to unity, that is in excess of 0.9. This result obtains because the excitation current for the current dependent inductances is obtained from excitation condensers charged by the phase to phase voltage developed between the linear reactances and current dependent inductances, these voltages being distorted in a similar manner as the excitation current of the current dependent inductances.

What I claim as my invention is:

1. A power supply system having a multiphase source of alternating current of predetermined frequency and adapted to deliver a single phase output power comprising in combination; a primary structure for each phase of said source energizable by the latter having a current voltage relationship which is non-linear for each phase of said source; a reactance having a current voltage relationship which is linear disposed between the primary structure and the corresponding phase of said source providing a high impedance path for harmonic components of said frequency reflected by said primary structure; said linear reactances developing non-sinusoidal voltages phase to phase between said linear reactances and said primary stuctures; condensers interposed between the said primary structures for providing a low impedance path for harmonic currents passing non-sinusoidal current to said primary structures and means thereby to obtain single phase high frequency power symmetrically distributed with respect to said source; the relationship between the said low impedance means and the high impedance means being such that a substantial unit power factor results at the source.

2. A power supply system having a multiphase source of alternating current of predetermined frequency and adapted to deliver a single phase output comprising in power combination; a primary structure for each phase of said source energizable by the latter having a current voltage relationship which is non-linear for each phase of said source; a reactance having a current voltage relationship which is linear disposed between the primary structure and the corresponding phase of said source providing a high impedance path for harmonic components of said frequency reflected by said primary structure; said linear reactances developing non-sinusoidal voltages phase to phase between said linear reactances and said primary structures, condensers interposed between the said primary structures for providing a low impedance path for harmonic currents passing non-sinusoidal current to said primary structures; secondary windings for each primary structure magnetically coupled to the latter; and means connecting said secondary windings electrically in series thereby to obtain single phase high frequency power symmetrically distributed with respect to said source; the relationship between the said low impedance means and the high impedance means being such that a substanital unity power factor results at the source.

3. A power supply system having a multiphase source of alternating current of predetermined frequency and adapted to deliver a single phase output comprising in power combination; a primary structure for each phase of said source energizable by the latter having a current voltage relationship which is nonlinear for each phase of said source; a reactance having a current voltage relationship which is linear disposed between the primary structure and the corresponding phase of said source providing a high impedance path for harmonic components of said frequency reflected by said primary structure; said linear reactances developing non-sinusoidal voltages phase to phase between said linear reactances and said primary structure, condensers interposed between the said primary structures for providing a low impedance path for harmonic currents passing non-sinusoidal current to said primary structures; secondary windings for each primary structure magnetically coupled to the latter; and means connecting said secondary windings electrically in series thereby to obtain a single phase high frequency power of a continuous symmetrical wave form composed of only the tripling harmonics of the fundamental supply symmetrically distributed with respect to said source; the relationship between the said low impedance means and the high impedance means being such that a substantial unity power factor results at the source.

4. A power supply system having a multiphase source of alternating current of predetermined frequency and adapted to deliver a single phase output comprising in power combination; a primary structure for each phase of said source energizable by the latter having a current voltage relationship which is non-linear for each phase of said source; a reactance having a current voltage relationship which is linear disposed between the primary structure and the corresponding phase of said source providing a high impedance path for harmonic components of said frequency reflected by said primary structure; said linear reactances developing non-sinusoidal voltages phase to phase between said linear reactances and said primary structures and developing a continuous symmetrical wave form for each the voltage and the current consisting of the fundamental sine wave and odd harmonics; the separate waves being displaced in phase; condensers interposed between the said primary structures for providing a low impedance path for harmonic currents passing non-sinusoidal current to said primary structures and means thereby to obtain single phase high frequency power symmetrically distributed with respect to said source; the relationship between the said low impedance means and the high impedance means being such that a substantial units power factor results at the source.

5. A power supply system having a multiphase source of alternating current of predetermined frequency and adapted to deliver a single phase output comprising in power combination; a primary structure for each phase of said source energizable by the latter having a current voltage relationship which is non-linear for each phase of said source; a reactance having a current voltage relationship which is linear disposed between the primary structure and the corresponding phase of said source providing a high impedance path for harmonic components of said frequency reflected by said primary structure; said linear reactances developing non-sinusoidal voltages phase to phase between said linear reactances and said primary structures and developing a continuous symmetrical wave form for each of the voltage and the current consisting of the fundamental sine wave and odd harmonics, the separate waves being displaced in phase; condensers interposed between the said primary structures for providing a low impedance path for harmonic currents passing non-sinusoidal current to said primary structures and means thereby to obtain single phase high frequency power of a continuous symmetrical wave form composed of only the tripling harmonics of the fundamental supply symmetrically distributed with respect to said source; the relationship between the said low impedance means and the high impedance means being such that a substantial unity power factor results at the source.

6. A power supply system having a multiphase source of alternating current of predetermined frequency and adapted to deliver a single phase output comprising in power combination; a primary structure for each phase of said source energizable by the latter having a current voltage relationship which is non-linear for each phase of said source; a reactance having a current voltage relationship which is linear disposed between the primary structure an the corresponding phase of said source providing a high impedance path for harmonic components of said frequency reflected by said primary structure; said linear reactances developing non-sinusoidal voltages phase to phase between said linear reactances and said primary structures, condensers interposed between the said primary structures for providing a low impedance path for harmonic currents passing non-sinusoidal current to said primary structures; secondary windings for each primary structure magnetically coupled to the latter; and means connecting said secondary windings electrically in series thereby to obtain single phase high frequency power symmetrically distributed with respect to said source; the relationship between the said low impedance means and the high impedance means being such that a substantial unity power factor results at the source; and a five leg core including a plurality of windings, at least three of said windings being primary windings symmetrically distributed on the core, the remainder of said windings being the said secondary windings.

References Cited in the file of this patent

UNITED STATES PATENTS

| | | |
|---|---|---|
| 1,157,730 | Spinelli | Oct. 26, 1915 |
| 1,537,371 | Petersen | May 12, 1925 |
| 2,313,440 | Huge | Mar. 9, 1943 |
| 2,367,625 | Short | Jan. 16, 1945 |
| 2,383,177 | Drake | Aug. 21, 1945 |
| 2,451,189 | Alexanderson et al. | Oct. 12, 1948 |
| 2,727,159 | Sunderlin | Dec. 13, 1955 |

UNITED STATES PATENT OFFICE
CERTIFICATE OF CORRECTION

Patent No. 3,040,231　　　　　　　　　　　　June 19, 1962

Paul P. Biringer

It is hereby certified that error appears in the above numbered patent requiring correction and that the said Letters Patent should read as corrected below.

Column 3, line 47, for "stuctures" read -- structures --; line 54, for "unit" read -- unity --; column 4, line 4, for "substanital" read -- substantial --; line 56, for "units" read -- unity --.

Signed and sealed this 16th day of October 1962.

(SEAL)
Attest:

ERNEST W. SWIDER
Attesting Officer

DAVID L. LADD
Commissioner of Patents